United States Patent [19]

Singh

[11] Patent Number: 5,056,935
[45] Date of Patent: Oct. 15, 1991

[54] OIL FILM DAMPER SEAL RING

[75] Inventor: Anant P. Singh, Cincinnati, Ohio

[73] Assignee: General Electric Company, Cincinnati, Ohio

[21] Appl. No.: 609,332

[22] Filed: Nov. 5, 1990

[51] Int. Cl.⁵ .............................................. F16C 39/04
[52] U.S. Cl. ................................................... 384/99
[58] Field of Search ................ 384/99, 479, 150, 129, 384/477

[56] References Cited

U.S. PATENT DOCUMENTS

| 4,046,430 | 9/1977 | Buono et al. | 384/99 |
| 4,453,783 | 6/1984 | Davis et al. | 384/99 |
| 4,867,655 | 9/1989 | Barbic et al. | 384/99 |
| 4,971,457 | 11/1990 | Carlson | 384/99 |

OTHER PUBLICATIONS

"Experimental Measurement of the Dynamic Force Response of a Squeeze Fiom Damper-Vance and Kirton", Transactions of the ASME, Nov. 1975, p. 1283.

Primary Examiner—Lenard A. Footland
Attorney, Agent, or Firm—Jerome C. Squillaro

[57] ABSTRACT

A squeeze film damper employs spaced apart diagonal cross-section piston ring seals in diagonal cross-section grooves in cross-section to cross-section matching and registry relationship with diagonal surfaces directly exposed to the squeeze film space between the rings.

9 Claims, 1 Drawing Sheet

OIL FILM DAMPER SEAL RING

BACKGROUND OF THE INVENTION

This invention relates to oil film dampers which find effective use as applied to high speed turbo machines, for example the turbine rotor and shaft of a hot gas turbine engine such as an aircraft gas turbine engine, for vibration damping, and more particularly to improved piston type sealing rings therefor. Hot gas turbine engines usually employ a shaft mounted turbine wheel or rotor with the shaft positioned and supported between spaced rolling element bearings. Vibration damping capacity of this kind of rotor system where rotor-shaft imbalance is present is limited and difficult to predict. As a consequence, resonant vibrations are not only potentially violent and destructive but also deleteriously affect various operational speeds of the turbine rotor. Unless there is adequate damping in the rotor system, resonant excitation of a critical speed at the operating condition of the engine, or in acceleration through the critical speed, can result in rotor vibration amplitudes of destructive levels.

For the above reasons it has become a practice to utilize squeeze film dampers in conjunction with the supporting rolling element bearings of hot gas turbine engines.

In general such a damper includes an arrangement in which a bearing support member, for example, the outer annular race of a rolling element bearing, may move transversely radially and orbitally in a closely confining annular chamber in the bearing or engine housing. Oil under pressure is introduced into a defined annular squeeze film space between the bearing support and an opposite chamber wall. The noted support motion acts to exert a compressive force on or squeeze the oil film to cause viscous flow of the oil and resistance to motion of the bearing support. Such dampers as described may utilize piston ring type seals for the squeeze film space at each side thereof. These piston ring seals are generally used in combination with an open oil dam or groove at the ends of the squeeze film space next adjacent a ring for better ring sealing but with a change in fluid pressure distribution in the damper and some resultant loss of effectiveness of the damper. Attempts to eliminate the oil dam or its adverse effects have continued without a fully satisfactory solution.

OBJECTS OF THE INVENTION

It is an object of this invention to provide an improved piston ring oil seal.

It is another object of this invention to provide an improved piston ring seal for squeeze film dampers.

It is a further object of this invention to provide an improved squeeze film damper space between piston ring seals in squeeze film dampers without an oil dam.

SUMMARY OF THE INVENTION

This invention provides a combination of a diagonal cross-section squeeze film damper piston type ring in a diagonal cross-section to seal a squeeze film space in a squeeze film damper. Damper fluid in the space between diagonal surfaces obviates the oil dam.

This invention will be better understood when taken in connection with the following drawings and description.

DESCRIPTION OF A PREFERRED EMBODIMENT

Figure 1:
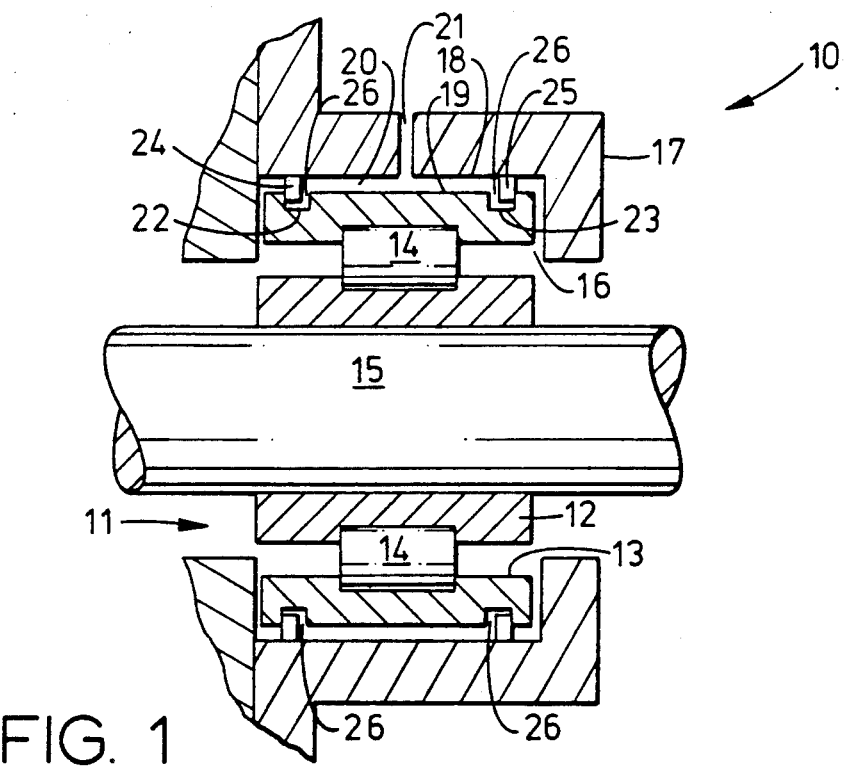
FIG. 1 is a schematic and cross-sectional illustration of a squeeze film damper assembly.

Referring now to FIG. 1, squeeze film damper assembly 10 is illustrated as combined with a rolling element bearing assembly 11 having an inner race 12 and a spaced outer race 13 with rolling elements 14 therebetween. A turbine rotor shaft 15 projects through inner race 12. Outer race 13 of bearing assembly 11 comprises a short hollow cylinder or annulus which slidingly fits in a closely confining annular chamber 16 of a bearing housing 17 for limited radial motion therein. Chamber 16 includes a circumferential wall 18 which is complementary to the outer circumferential surface 19 of annular race 13. Race 13 fits in chamber 16 in close spaced relationship to define a narrow annular squeeze film space 20. A damper fluid such as an oil, under pressure, is introduced into squeeze film space 20 by means of an oil inlet conduit 21 in housing 17. During rotation of shaft 15, for example, as a turbine rotor shaft of a hot gas turbine engine, a mass imbalance may cause shaft 15 to vibrate radially and/or tend to cause shaft 15 to move transversely in a limited orbital manner. Since bearing race 13 may also move transversely, radially and orbitally, in chamber 16, race 13 exerts a compressive or squeezing force in the oil in squeeze film space 20 to cause viscous flow of the oil, to other regions of the annular space 20, which generates a damping resistance to vibratory or orbital motion of race 13 in chamber 16.

An important factor in the operation of damper assembly 10 is sealing of the damper oil in squeeze film space 20. One sealing means usually employed is a piston ring seal. As shown in FIG. 1, the circumferential outer surface of race 13 includes a pair of opposite or spaced apart concentric piston ring grooves 22 and 23 which receive piston rings 24 and 25 respectively therein. A piston ring is usually formed from a hard metal strip into a circular configuration with the ends of the strip in closely spaced abutting gap relationship. The defined ring gap permits the ring to be compressed under operating conditions of the damper and to reexpand to maintain sealing with the opposing cylindrical wall.

In a damper assembly, end sealing of the squeeze film space by piston ring seals is assisted by damper oil pressure in space 20. For example, as illustrated in FIG. 1, piston ring grooves 22 and 23 are shown of a significantly wider dimension than the width dimension of rings 24 and 25 in the grooves. The dimensional difference provides an oil filled space 26 next adjacent ring 24 and 25. This vent space, sometimes referred to as an oil dam, is in direct fluid flow communication with squeeze film space 20, and accordingly, oil under pressure flows from squeeze film space 20 into vent space 26 and bears against the sidewall of rings 24 and 25 to press these rings against their opposite groove sidewall for additional sealing effectiveness. A vent space 26 is utilized for each ring 24 and 25. However, a vent space, such as vent space 26, having a depth or thickness much greater than that of squeeze film space 20, is a disadvantage in damper operation. Vent space 26 represents an unconstrained fluid film boundary region of squeeze film space 20 at a lower pressure, for that reason, detracts from the effective width of the fluid film in squeeze film space 20 as well as maintenance of damper fluid pressure therealong. Elimination of a vent space adds to the effective width of a squeeze film space 20 without a change in structural dimensions and better operation of the damper assembly. A diagonal cross-section piston ring of this invention essentially eliminates a vent space and its associated problems while providing better sealing and more effective operation of damper assembly 10. A diagonal cross-section piston ring is illustrated in FIG. 2.

Figure 2:
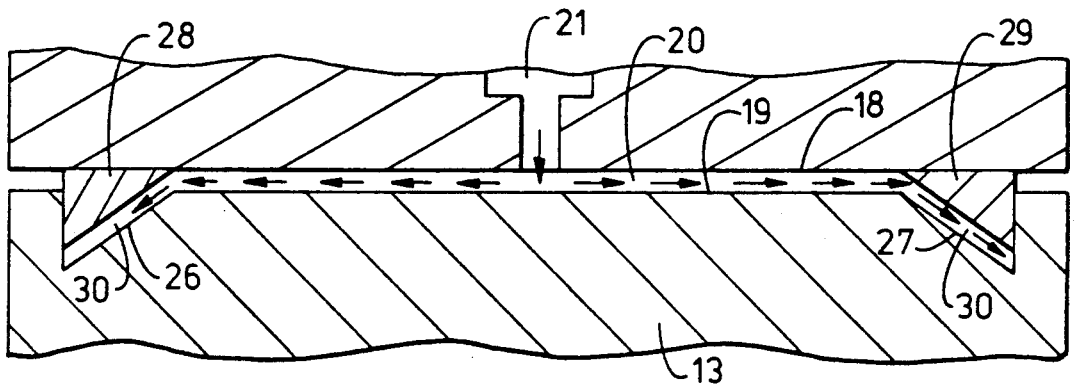
FIG. 2 is a schematic and cross-sectional illustration of a diagonal (triangular) cross-section piston ring seal of this invention.

Referring now to FIG. 2, the outer circumferential surface 19 of a rolling element outer race 13 is illustrated as defining a squeeze film space 20 with a circumferential housing wall 18. Outer race 13 includes a pair of spaced apart diagonal, for example, triangular, cross-section grooves 26 and 27 concentrically positioned on race 13. Triangular cross-section grooves 26 and 27 are formed in race 13 with an apex of the triangle projecting radially into race 13 as illustrated in FIG. 2 with one side wall being perpendicular to the central axes of annular race 13 and the diagonal surfaces of the grooves facing towards each other, one ring being reversed with respect to the other ring. A planar base surface of the triangle projects from the groove to engage opposite circumferential wall 18 of housing 17. Diagonal, for example, triangular, cross-section rings such as right triangular cross-section rings 28 and 29 are fitted in grooves 26 and 27 with a triangle apex directed radially inwardly into race 13 and with a base of the triangle projecting from its groove in spaced parallel relationship to the central axis or circumferential surface 19 to slidingly engage circumferential wall 18 of housing 17.

As illustrated in FIG. 2, oil under pressure is introduced through inlet conduit 21 to flow into squeeze film space 20. At the opposite ends of space 20, damper oil under pressure in squeeze film space 20 is not adversely influenced by a vertical vent space or dam 26 of lower pressure as described for FIG. 1, but to the contrary, remains supported by a thinner film of damper oil in the narrow slant space 30 between the diagonal surface of the triangular rings 28 and 29 and the spaced adjacent diagonal surface of a ring groove, the slant space 30 being in open fluid flow communication with squeeze film space 20. The diagonal (surface) of a groove wall is adjacent, but spaced from and parallel to the digonal (surface) of a ring so that the diagonal of the ring is directly exposed to the squeeze film gap and the fluid pressure therein. The thickness of the oil film in space 30 is no more than the thickness of the oil film in squeeze film space 20. The diagonal surface becomes a force resolving surface to provide both a lateral force causing rings 28 and 29 to bear against their groove walls as well as a vertical component to cause rings 28 and 29 to bear against circumferential wall 18 of housing 17 for additional sealing. Accordingly, without a vertical vent space at the ends of squeeze film space 20, representing an unconstrained film boundary, effective squeeze film space width is advantageously increased without additional physical space requirement. Moreover, the hydrodynamic pressure generated in the circumferential slant regions provides additional damper stability as well as improved ring sealing.

Figure 3:
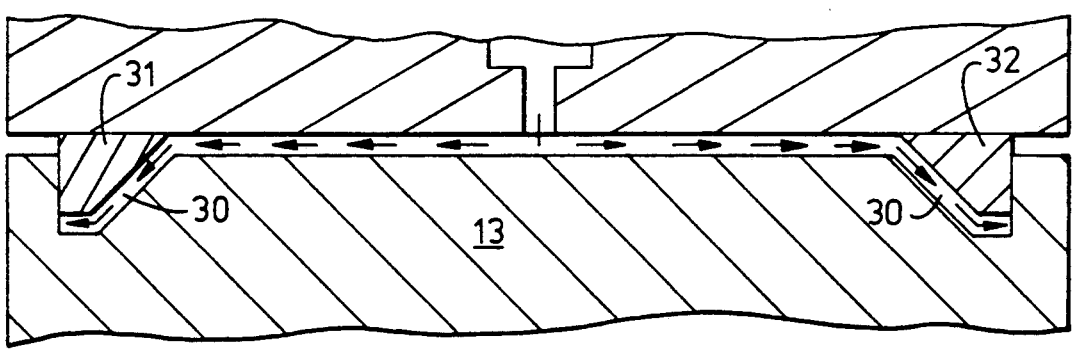
FIG. 3 is a schematic and cross-sectional ilustration of a further diagonal (trapezoidal) cross-section piston ring seal of this invention.

A further diagonal cross-section ring is illustrated in FIG. 3.

Referring now to FIG. 3 piston rings 31 and 32 are shown with a trapezoidal diagonal cross-section, each ring exposing a diagonal (surface) to the squeeze film space 20. As in FIG. 2 a resolution of the exerted forces shows a wedging action of the ring against an outside groove wall and a vertical action biasing the ring against opposite circumferential wall 18 of housing 17. The piston ring seals of this invention and their grooves have complementary cross-sections so that a ring cross-section and a groove cross-section are in matched registry relationship when the ring is fitted in the groove.

This invention provides an improved squeeze film damper with piston ring seals and grooves of diagonal cross-section which eliminate the use of a vertical oil filled dam adjacent a ring. The diagonal ring feature of this invention is widely applicable to other squeeze film devices utilizing piston ring seals including, for example, hydrodynamic bearings such as sleeve or journal bearings.

While this invention has been disclosed with respect to preferred embodiments thereof it will be apparent to those skilled in the art that various changes and modifications may be made therein without departing from the spirit and scope of the invention as set out in the following claims.

What is claimed is:

1. In a squeeze film damper comprising a housing with a rolling element bearing assembly therein with an annular bearing race member thereof slidingly fitted in an annular chamber of said housing for transverse radial and orbital motion therein, and where the bearing race member and housing each include a circumferential wall in close spaced nesting relationship to define a squeeze film space therebetween, the improvement comprising, the said bearing support circumferential wall having a pair of spaced apart concentric diagonal-containing cross-section grooves therein with said squeeze film space therebetween.

2. The invention as recited in claim 1 wherein the diagonal of said grooves face towards each other.

3. The invention as recited in claim 1 wherein a diagonal-containing cross-section piston ring seal is positioned in each said grooves in ring cross-section and groove cross-section registry relationship.

4. The invention as recited in claim 3 wherein the diagonal of each said ring is exposed directly to the squeeze film space therebetween.

5. The invention as recited in claim 3 wherein the diagonal of said rings and the diagonal of said grooves are in spaced apart parallel relationship to define an oil filled slant space in fluid flow communication with said squeeze film space.

6. The invention as recited in claim 5 wherein the distance between said spaced apart diagonals is no more than the thickness of said squeeze film space.

7. The invention as recited in claim 5 wherein said diagonals are the diagonals of a right triangle.

8. The invention as recited in claim 5 wherein said diagonals are the diagonals of a trapezoid.

9. The invention as recited in claim 5 wherein said rings slidingly project from said grooves to provide a circumferential planar surface in engagement with an opposite circumferential planar surface.

* * * * *